(No Model.)

J. W. McKNIGHT.
BILLIARD TABLE TOP.

No. 299,565. Patented June 3, 1884.

Witnesses: Inventor:
J. W. McKnight

UNITED STATES PATENT OFFICE.

JOHN WESTLEY McKNIGHT, OF WASHINGTON, DISTRICT OF COLUMBIA.

BILLIARD-TABLE TOP.

SPECIFICATION forming part of Letters Patent No. 299,565, dated June 3, 1884.

Application filed November 5, 1883. (No model.)

*To all whom it may concern:*

Be it known that I, JOHN W. MCKNIGHT, a citizen of the United States, residing at Washington city, in the District of Columbia, have invented certain new and useful Improvements in Billiard-Table Tops, of which the following is a specification, reference being had therein to the accompanying drawings.

My invention relates to the manufacture of billiard-table tops, the object of which is to provide a cheap and durable top which will not be affected by climatic changes or by moisture.

My invention consists in making billiard-table tops and analogous articles from artificial slate, as will more fully hereinafter appear.

Figure 1:
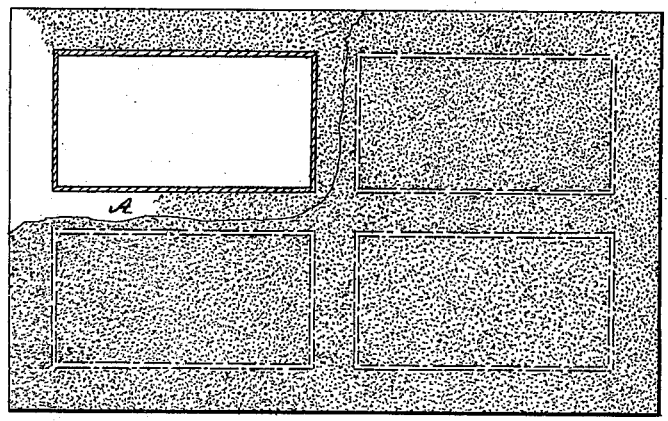
Figure 2:
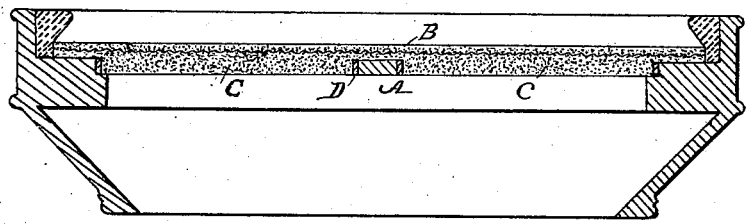
Figure 3:
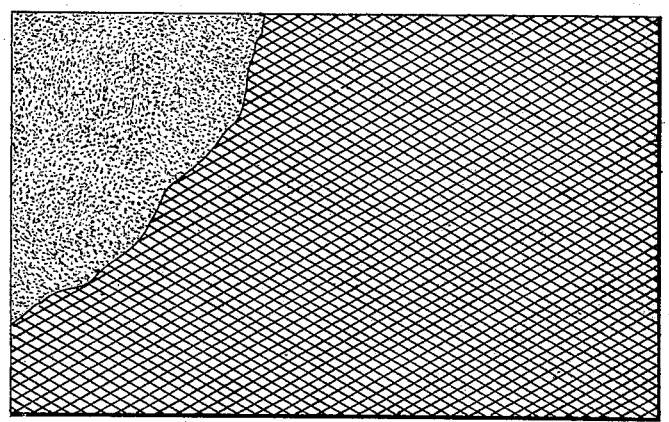

Referring to the drawings, Figure 1 is a top or plan view of my billiard-table top. Fig. 2 is a longitudinal sectional view, and Fig. 3 is a top view with a portion of the surface removed to show the wire gauze or netting.

In the manufacture of billiard-tables according to my invention, I divide the space within the cushion-molding into sections, as indicated in the drawings, by a framing of wood, metal, or other suitable material, so as to give support to the top. I have shown in the drawings four such spaces formed by the frame-work A, and bounded on the outside by the sides of the table. The top proper, or the portion B, is composed of artificial slate, or a mixture of any good cement with any suitable coloring-matter which gives it the appearance and qualities of the natural slate. I may remark in this connection that I do not choose to describe or claim in this application the ingredients or the manner of compounding the same to produce this artificial slate, reserving to myself the right to file a separate application therefor.

By further reference to the drawings it will be observed that the top of the table is not of a uniform thickness, the portions *c*, which are embraced within the spaces formed by the frame-work, being of double thickness, so as to give greater rigidity and strength to the top, and to further strengthen it I embed within the body of the cement a sheet or sheets of wire-gauze, D, while the shoulders or offsets formed by the thicker parts afford a good bearing-surface on the frame-work A. These slabs of artificial slate, which form the tops of the tables, may be made at the factory and transported to the place where they are to be set in the table; but I may find it convenient and desirable in many instances to cast the top in the frame of the table where it is to remain permanently, and to carry out this method of construction I place boards or other suitable material on the under side of the frame-work, so as to hold the composition, and then fill in the spaces and cover the frame-work to a sufficient depth with the plastic cement composition.

In order to prevent the wood-work which forms the sides of the table, and the timbers of the frame-work which form the spaces, from being warped or affected by the moisture from the plastic composition, I place strips D, of natural slate, oiled paper, tin, galvanized iron, glass, rubber, or other water-proof material around the edges of the spaces prior to filling in the cement.

I do not limit myself to the construction of billiard-table tops alone by the processes herein named, as it is obvious that other tables—such as imposing-tables for printers' use—can be made in the manner described without departing from the spirit of my invention.

Having thus described my invention, what I claim, and desire to secure by Letters Patent, is—

1. A billiard-table top formed of artificial slate having embedded therein sheets or strips of wire gauze or netting, as set forth.

2. A billiard-table top formed of artificial slate having a smooth upper surface, the body of which is of varying thickness, and having embedded therein sheets or strips of wire gauze or netting, as set forth.

In testimony whereof I affix my signature in presence of two witnesses.

JOHN WESTLEY McKNIGHT.

Witnesses:
C. A. NEALE,
F. W. RITTER, Jr.